Jan. 18, 1938. F. LANG 2,105,662

AIR CHAMBER DIESEL ENGINE

Filed Dec. 9, 1935

Inventor:
Franz Lang.
By Brown, Jackson, Boettcher & Dienner.
Attys.

Patented Jan. 18, 1938

2,105,662

UNITED STATES PATENT OFFICE 2,105,662

AIR CHAMBER DIESEL ENGINE

Franz Lang, Munich, Germany, assignor, by mesne assignments, to Lanova Corporation, New York, N. Y., a corporation of Delaware Application December 9, 1935, Serial No. 53,541
In Germany December 13, 1934

3 Claims. (Cl. 123—32)

This invention relates to Diesel engines, and has to do with injection engines of the air storage chamber type.

The present invention is directed to an air storage chamber Diesel engine having a main combustion chamber inwardly off-set with respect to the piston displacement space of the cylinder, the upper portion of this chamber being arched in vertical cross-section, with inclined roof walls, and constituting a valve chamber. The main combustion chamber is of approximately heart or figure 8 shape in plan, and the injection nozzle and air storage chamber open into this main combusion chamber at the central portion thereof. This contributes to ease of operation of the valves and causes the main combustion and regulated flow of the fuel mixture charge to occur in the lower portion of the combustion chamber.

It is a further object of my invention to dispose the injection nozzle and the opening of the air storage chamber in such manner that the axes thereof are either in the same plane as, or lower than, the point of intersection of the valve axes with the cylinder axis. This further assures that the main combustion will occur in the lower portion of the combustion chamber.

It is also an object of my invention to shield the injection nozzle against heating due to the blast effect of the fluid stream ejected at high velocity from the air storage chamber. With this in view, the injection nozzle or nozzles, may be arranged so as to be protected by an inwardly projecting element of the wall of the combustion chamber, at the constriction thereof.

Further objects and advantages of my invention will appear from the detail description.

In the drawing:—

Figure 1:
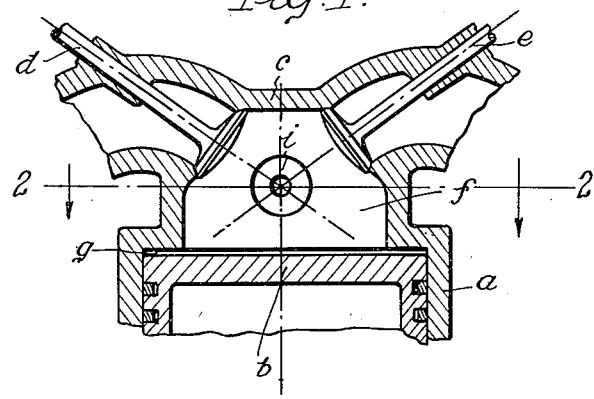
Figure 1 is an axial sectional view through the end portion of a cylinder and an associated combustion chamber, of an injection engine embodying my invention, showing those parts with which my invention is concerned, certain parts being shown in elevation.

In the drawing, the cylinder is indicated at $a$, the piston at $b$, the cylinder head at $c$, the intake valve at $d$ and the exhaust valve at $e$. The main combustion chamber $f$ is offset with respect to the piston displacement space $g$ and is of arched or inclined roof formation in vertical cross-section, the valves $d$, $e$ being arranged in the inclined walls. The main combustion chamber $f$, into which the injection nozzle $h$ and the air chamber $i$ open, is of substantially heart shape in plan.

The valves $d$ and $e$ control inlet and exhaust passages, respectively, opening through the inclined walls of the roof of the combustion chamber, and the axes of these valves are substantially normal to these walls, respectively, as shown.

The axes of the injection nozzle, or nozzles, and of the air chamber orifice are in a common plane, and this plane may be at the same height within the combustion chamber as the point of intersection of the valve axes with the central axis of the cylinder, as shown in Figure 1, or it may be lower, in which latter case the main combustion and regulated main flow of the fuel mixture charge takes place even more emphatically in the lower portion of the main combustion chamber.

Figure 2:
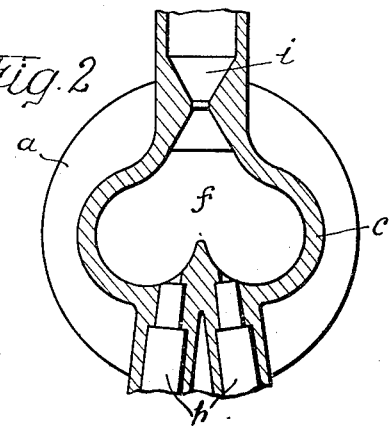
Figure 2 is a sectional view taken substantially on line 2—2 of Figure 1, certain parts being shown in elevation.

In Figure 2 an injection nozzle $h$ is provided at each side of the inwardly projecting element at the constriction of the combustion chamber, the axes of these injection nozzles being arranged at an acute angle to each other and symmetrical with respect to the air chamber orifice axis. The injection nozzles are thus shielded from the blast of fluid ejected from the air storage chamber.

The combustion chamber comprises, in plan, two lobes and a constriction therebetween defining, at one side of the constriction, an inwardly projecting element in the form of an inwardly tapering point. The orifice of the air storage chamber is aligned with the vertex of this element and opens into the combustion chamber through a passage flaring inward thereof. The axis of the respective injection nozzles is in the plane of the axis of the air storage chamber orifice, and the nozzle injects fuel into the combustion chamber and into the air storage chamber through the orifice of the latter and the flaring passage leading thereto.

I claim:—

1. In an injection engine of the character described, a cylinder and a piston operating therein, a combustion chamber inwardly offset with respect to the cylinder and opening downward thereinto, said chamber comprising in plan two lobes and a constriction therebetween defining an element of substantially V-shape in plan projecting and tapering inward of said chamber at one side of said constriction, an air storage chamber opening into said constriction at the other side thereof through a restricted orifice aligned with the vertex of said element, and an injection nozzle at said one side of said constriction disposed to inject fuel across said combustion chamber toward said orifice, said nozzle being disposed in proximity to one side of said inwardly projecting element with its tip adjacent the base of said element, the latter acting to split the hot blast fluid stream ejected from said air storage chamber through said orifice toward said element and to deflect the portions of the split stream laterally into said lobes and away from said nozzle, thereby shielding the latter from the hot blast ejected through said orifice.

2. In an injection engine of the character described, a cylinder and a piston operating therein, a combustion chamber inwardly offset with respect to the cylinder and opening downward thereinto, said chamber comprising in plan two lobes and a constriction therebetween defining an element of substantially V-shape in plan projecting and tapering inward of said chamber at one side of said constriction, an air storage chamber opening into said constriction at the other side thereof through a restricted orifice aligned with the vertex of said element, and two injection nozzles at said one side of said constriction disposed to inject fuel across said combustion chamber toward said orifice, said nozzles being arranged at an acute angle to each other and disposed at opposite sides of and in proximity to said inwardly projecting element with their tips adjacent the base of said element, the latter acting to split the hot blast fluid stream ejected from said air storage chamber through said orifice toward said element and to deflect the portions of the split stream laterally into said lobes away from said nozzles, thereby shielding the latter from the hot blast ejected through said orifice.

3. In an injection engine of the character described, a cylinder and a piston operating therein, a combustion chamber opening into the cylinder having a wall of substantially circular curvature in a plane normal to the cylinder axis, said chamber being provided at one side with an element of substantially V-shape in plan projecting inwardly from said wall and tapering inward of said chamber, the base of said element being formed tangentially to the substantially circular curvature of the combustion chamber wall, an air storage chamber opening into said combustion chamber through a restricted orifice at the opposite side thereof aligned with the vertex of said element, and an injection nozzle in proximity to one side of said element disposed to inject fuel toward said orifice, the tip of said nozzle being adjacent the base of said element, the latter acting to split the hot blast fluid stream ejected through said orifice toward said element and to deflect the portions of the split stream laterally into said combustion chamber away from said nozzle, thereby shielding the latter from the hot blast ejected through said orifice.

FRANZ LANG.